(12) United States Patent
Chen

(10) Patent No.: US 6,833,880 B1
(45) Date of Patent: Dec. 21, 2004

(54) BRACKET FOR CRT

(75) Inventor: Luan Chi Chen, Garden Grove, CA (US)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 365 days.

(21) Appl. No.: 09/898,161

(22) Filed: Jul. 2, 2001

(51) Int. Cl.$^7$ .............................. H04N 5/74; H04N 7/31
(52) U.S. Cl. ....................................... 348/787; 348/789
(58) Field of Search ................................. 348/787, 788, 348/789, 781, 785, 756, 750, 782; H04N 5/74, 7/31

(56) References Cited

U.S. PATENT DOCUMENTS

| | | | | |
|---|---|---|---|---|
| 4,417,273 A | * | 11/1983 | Kloss | 348/788 |
| 4,941,036 A | * | 7/1990 | Itoh | 348/778 |
| 5,363,149 A | * | 11/1994 | Furuno et al. | 348/789 |

FOREIGN PATENT DOCUMENTS

| | | |
|---|---|---|
| JP | 5-130540 | 5/1993 |
| JP | 5-130541 | 5/1993 |
| JP | 5-183847 | 7/1993 |
| JP | 7-79398 | 3/1995 |
| JP | 8-138582 | 5/1996 |

* cited by examiner

Primary Examiner—Michael H. Lee
(74) Attorney, Agent, or Firm—Orrick, Herrington & Sutcliffe LLP

(57) ABSTRACT

An enclosure for a projection television set is provided that includes an upper compartment to house a mirror and a screen, and a lower compartment attached to the upper compartment. The lower compartment preferably includes a front panel, a rear panel, and a plurality of side panels wherein at least two side panels have an attachment region for a bracket of an optical unit. The attachment region may be angled surfaces designed to aim the optical unit toward the mirror of the projection television set. The attachment region may also be angled openings for insertion of first and second ends of the bracket of the optical unit therein, the angled openings configured to aim the optical unit toward the mirror. Alternatively, the attachment region may include a member having an elongate body with a top surface, a bottom surface, a first end, a second end, and a notch extending between the ends along the top surface of the elongate body, wherein the notch engages the bracket of the optical unit. In another embodiment, a bracket for an optical unit of a projection television set is provided that includes first and second ends having a horizontal extension oriented at approximately 90 degrees to a vertical wall. The horizontal extension rests atop an angled top surface of a side panel of a lower compartment of an enclosure of the present invention, while the vertical wall attaches to the side panel, thereby eliminating the need for additional mounting bracket hardware.

16 Claims, 7 Drawing Sheets

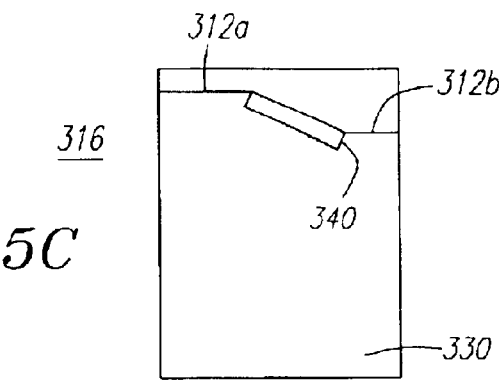
FIG. 5C
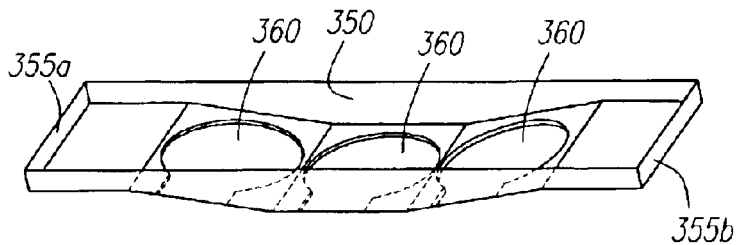
FIG. 6
FIG. 7

BRACKET FOR CRT

FIELD OF THE INVENTION

The present invention relates generally to projection television sets, and more particularly to optical unit brackets designed for attachment to projection television sets and projection television set enclosures incorporating the brackets.

BACKGROUND OF THE INVENTION

Projection television sets are a popular alternative to picture tube television sets, as they provide relatively large viewable screens that cannot be efficiently produced using conventional picture tubes. Projection television sets typically include an enclosure with an optical unit, a mirror, and electronic components for receiving and projecting an image onto a screen assembly mounted on the front of the enclosure.

A current, typical projection television set 100 is shown in FIGS. 1A–1C. Turning to FIG. 1A, the components of the projection television set 100 are illustrated. The projection television set 100 has an optical unit 10 that generally includes a set of projection units 20R, 20G, and 20B. Each projection unit projects an image, generally of a single color of light (red, green, or blue), onto the mirror M in the enclosure (not shown), which focuses the image onto an inside surface of the screen S. Each projection unit 20R, 20G, 20B includes a cathode ray tube (CRT) 22R, 22G, 22B, a projection lens assembly 45R, 45G, 45B, and a spacer 28R, 28G, 28B interposed between each respective CRT and projection lens assembly. The projection units 20R, 20G, 20B are mounted to a bracket 50. The bracket 50 is attached to a pair of enclosure mounting brackets 55a and 55b that hold the bracket 50 in place within the enclosure (not shown). Attachment elements 57a, 57b, which may be, e.g., screws or some other anchoring elements, secure the bracket 50 to the mounting brackets 55a, 55b.

FIG. 1B shows a side cut-away view of a current projection television set 100 having an enclosure 105 to contain the components previously described. The enclosure 105 is typically divided by an internal wall 112 into two compartments, an upper compartment 114 and a lower compartment 116. The internal wall 112 tightly seals the upper compartment 114 from the lower compartment 116 to protect the inside of the upper compartment 114 from dust and other foreign materials. The optical unit 10 is typically mounted in the lower compartment 116, while the mirror M and screen S are mounted in the upper compartment 112. Furthermore, the optical unit 10 typically extends from the lower compartment 116 into the upper compartment through the internal wall 112. The lower compartment 116 generally includes one or more sets of ventilation holes 118 to exhaust heat radiating from the optical unit 10 and any other components, such as, e.g., printed wiring boards (not shown) that may be located in the lower compartment 116.

To properly function, the projection units 20R, 20G, 20B of the optical unit 10 must be aimed at the mirror M along a predetermined, optimal angle. Consequently, mounting bracket 55 is configured to hold the bracket 50 in place within the enclosure 105 at a predetermined angle. The enclosure mounting brackets 55a and 55b hold the bracket 50 at an angular orientation substantially equal to the optimal angle of operation of the projection units 20R, 20G, 20B, thereby enabling the proper functioning of the projection units 20R, 20G, 20B. FIG. 1C is a top view of the enclosure 105 taken along line 1C in FIG. 1B. FIG. 1C illustrates the attachment of the mounting brackets 55a, 55b to the enclosure 105, and the attachment of the bracket 50 to the mounting brackets 55a, 55b. Attachment elements 59a, 59b are used to attach the mounting brackets 55a, 55b to the enclosure 105, and attachment elements 57a, 57b are used to attach the bracket 50 to the mounting brackets 55a, 55b.

The existing techniques for mounting the optical units of projection television sets have their disadvantages. The requirement for enclosure mounting brackets to secure a bracket to an enclosure results in an increase in the complexity of producing projection television sets. For example, construction, assembly, and attachment of the optic units to the bracket and further to the enclosure mounting brackets tends to be cumbersome and, thus, labor intensive. In addition, as previously discussed, the enclosure mounting brackets must be set at the proper angle in each individual projection television set in order to ensure that the optical units are aimed in the proper direction. The need to ensure that the enclosure mounting brackets are attached to each individual enclosure at the proper angle introduces variables, such as tolerance stacking, into the production of each individual set. As a result, the possibility of a defectively produced projection television set due to an improperly attached enclosure mounting bracket is increased. Therefore, it would be desirable to provide for a more efficient and reliable means for properly mounting the optical units to the enclosures, and apparatuses for accomplishing those means.

SUMMARY OF THE INVENTION

The present invention is directed to an improved projection television set enclosure that includes side panels and an optical unit bracket attached to the side panels without the need for the enclosure mounting brackets currently utilized by those skilled in the art. In one embodiment, a projection television set is provided that comprises an enclosure, a screen, a mirror, and an optical unit that includes a plurality of projection assemblies and an optical unit bracket. The enclosure includes an upper compartment to house the screen and mirror. The enclosure also includes a lower compartment, attached to the upper compartment, that has a front panel, a rear panel, and a plurality of side panels. At least two of the side panels of the lower compartment each have an angled top surface to which the optical unit bracket is attached. The optical unit bracket may be attached to the side panels using attachment elements, such as, e.g., screws and the like. Preferably, the angled top surface of each side panel is oriented to point the optical unit at the mirror along a predetermined angle when the optical unit bracket is affixed to the angled top surface.

The optical unit bracket of this embodiment of the present invention includes a first end and a second end, each end having a horizontal extension and a vertical wall adjacent the horizontal extension. The horizontal extension is placed on top of the angled top surface of a side panel and the vertical wall is placed adjacent the side wall. Preferably, the horizontal extension and the vertical wall are located at an approximately ninety degree angle relative to each other. The vertical wall may also include a plurality of openings through which attachment elements are inserted to affix the bracket to the side wall.

In another embodiment, a projection television set is provided that includes a screen, a mirror, an enclosure, and an optical unit comprising a plurality of projection assemblies and an optical unit bracket. The enclosure includes an upper compartment to house the mirror and screen, and a lower compartment attached to the upper compartment. The lower compartment includes a front panel, a rear panel, and a plurality of side panels. At least two of the side panels of the lower compartment have angled openings through which the optical unit bracket is inserted and secured. The openings are angled to aim the optical unit towards the mirror along a predetermined angle. Preferably, the optical unit bracket has a first end and a second end, with each end being substantially the same size and shape as an angled opening on a side panel such that, once inserted into the openings, the optical unit bracket is fixed to the side panels. Additionally, an adhesive may be placed around the circumference of the first and second ends of the optical unit bracket to further ensure that the optical unit bracket is secured to the side panels.

In another embodiment, rather than having either angled openings or angled top surfaces, the side panels of the lower compartment of an enclosure of the present invention have a bracket mounting member attached thereto. The bracket mounting member preferably includes an elongate body with a top surface, a bottom surface, and first and second ends. The bracket mounting member also preferably includes a notch extending between the first and second ends and along the top surface of its elongate body. The notch of the bracket mounting member receives and engages a detent that is located on the underside of one embodiment of the optical unit bracket. In this embodiment, the optical unit bracket includes detents on its first and second ends, on the underside of the bracket, extending along the width of the bracket.

Other objects and features of the present invention will become apparent from consideration of the following description taken in conjunction with the accompanying drawings.

DESCRIPTION OF THE DRAWINGS

FIG. 5C is a side view of the lower compartment shown in FIG. 5A.

FIG. 6 is an enclosure that incorporates the lower compartment shown in FIG. 5A.

FIG. 7 is a bracket of an optical unit configured for attachment to the openings of the side panels of the lower compartment shown in FIG. 5A.

DETAILED DESCRIPTION

Figure 2A:
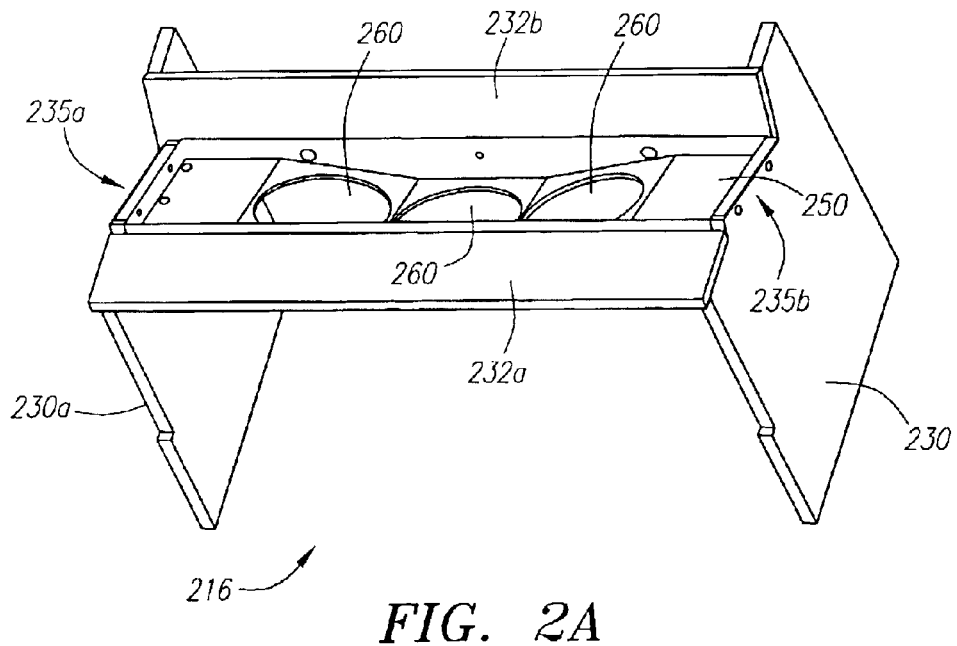
FIG. 2A is an illustration of an embodiment of the present invention showing a bracket attached directly to a lower compartment, having angled top surfaces, of a projection television set enclosure.

Turning to FIG. 2A, a lower compartment 216 of an enclosure 205 of a projection television set 200 of the present invention is illustrated. The lower compartment 216 has a front panel (not shown), a rear panel (not shown), and a plurality of side panels 230a, 230b. Panels 232a, 232b attach to the side panels 230a, 230b to form inner walls separating the space within the lower compartment 216 from the space within the upper compartment 214 (see FIG. 3) of the enclosure 205. In the illustrated embodiment, panel 232a is disposed between the front panel (not shown) and optical unit bracket 250 while panel 232b is disposed between the rear panel (not shown) and bracket 250. The side panels 230a, 230b each include an angled top surface 235a, 235b respectively.

Figure 3:
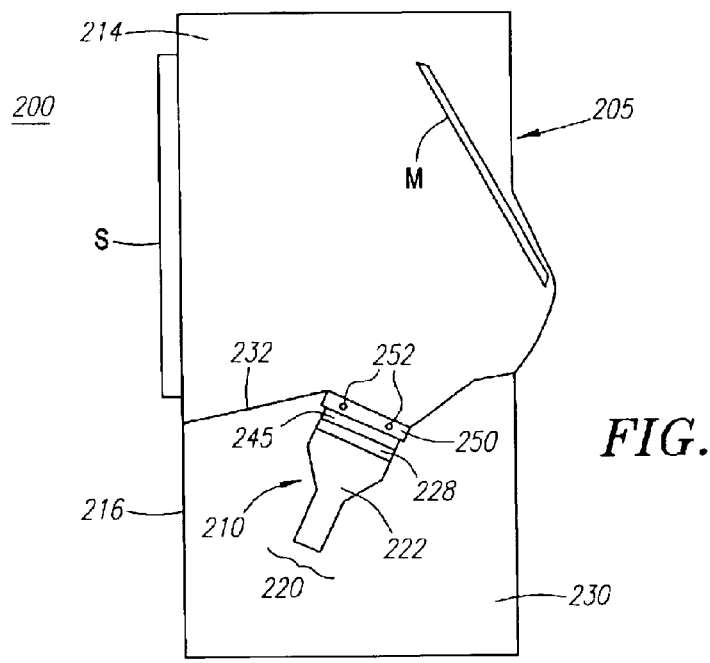
FIG. 3 is illustration of an embodiment of the present invention showing an enclosure having a lower compartment with angled top surfaces and a bracket attached directly to the angled top surfaces.

Optical unit bracket 250 is directly attachable to the side panels 230a, 230b and to the angled top surfaces 235a, 235b of side panels 230a, 230b. Optical unit bracket 250 forms part of an optical unit 210 that further includes a plurality of projection units 220. Each projection unit 220 includes a cathode ray tube (CRT) 222, a projection lens 245, and a spacer 228 mounted between each CRT 222 and projection lens 245. The optical unit 210 is attached to the optical unit bracket 250. Once the optical unit bracket 250 is attached to the side panels 230a, 230b and the angled top surfaces 235a, 235b of the side panels 230a, 230b, the optical unit 210 is secured in a fixed, angled position. Preferably, the angle in which the optical unit 210 is fixed corresponds to an angle that optimizes the operation of the optical unit 210. For example, the angle is preferably one that allows the optical unit 210 to accurately and efficiently project light onto a mirror M (FIG. 3) located within the upper compartment 214 (FIG. 3) of the enclosure 205 (FIG. 3). The presence of the angled top surfaces 235a, 235b on the side panels 230a, 230b eliminates the need for additional mounting bracket hardware to maintain the optical unit 210 in an optimally angled position, unlike conventional enclosures such as the enclosure 105 illustrated in FIGS. 1B and 1C.

Figure 2B:
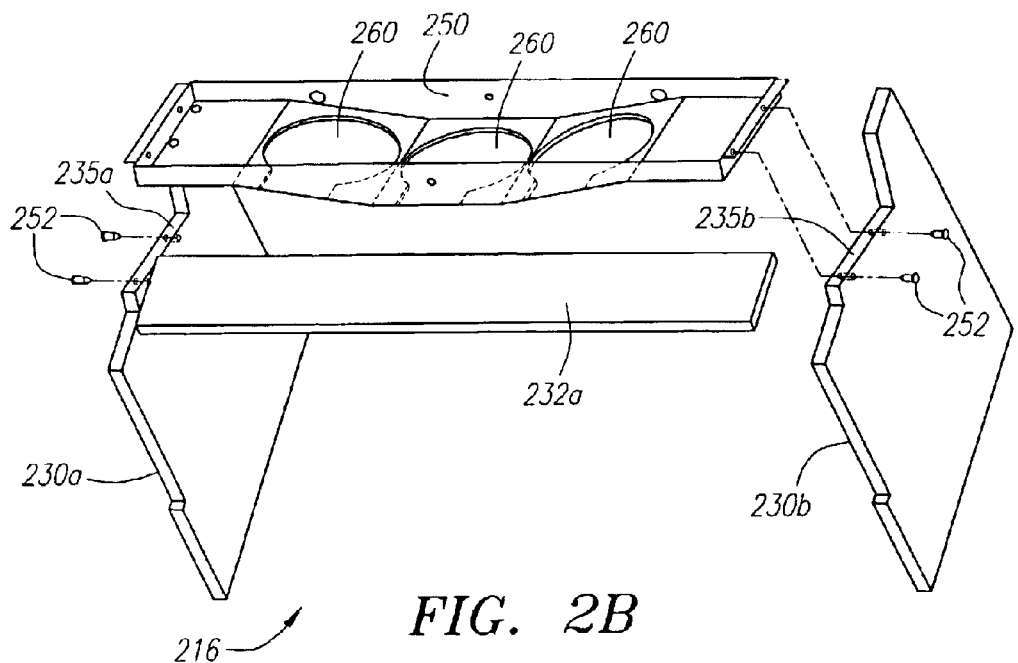
FIG. 2B is an exploded view of the embodiment of the present invention shown in FIG. 2A.

FIG. 2B illustrates an exploded view of lower compartment 216. As seen in FIG. 2B, a plurality of attachment elements 252 may be used to secure the optical unit bracket 250 of the optical unit 210 directly to the side panels 230a, 230b. The attachment elements 252 may be screws, nails, or the like. Although the illustrated embodiment utilizes two attachment elements 252 to attach each side of the optical unit bracket 250 to the side panels 230a, 230b, any number of attachment elements 252 may be used to secure the optical unit bracket 250 to the side panels 230a, 230b. Alternatively, the optical unit bracket 250 is attached to the side panels 230a, 230b, and to the angled top surfaces 235a, 235b of the side panels 230a, 230b, using an adhesive.

FIG. 3 illustrates a side view of one embodiment of an enclosure 205 of a projection television set 200 of the present invention. Lower compartment 216 is shown with the optical unit 210 attached thereto. An upper compartment 214 is attached to the top surface of the lower compartment 216 to form the enclosure 205. Housed within the upper compartment 214 is a mirror M and a screen S. As previously discussed, the optical unit bracket 250 of the optical unit 210 is fixedly secured to the side panels 230a, 230b (identified collectively as side panel 230 in FIG. 3) of the lower compartment 216 using a suitable attachment means, such as, e.g., attachment elements 252. When attached to the side panels 230a, 230b having angled top surfaces 235a, 235b, the optical unit bracket 250 is fixed in an angled position that enables the optical unit 210 to project light onto the mirror M. Preferably, the angled top surfaces 235a, 235b form an angle that enables the optical unit 210, once the optical unit bracket 250 is fixed to the side panels 230a, 230b, to optimally and efficiently project light onto the mirror M.

Figure 4:
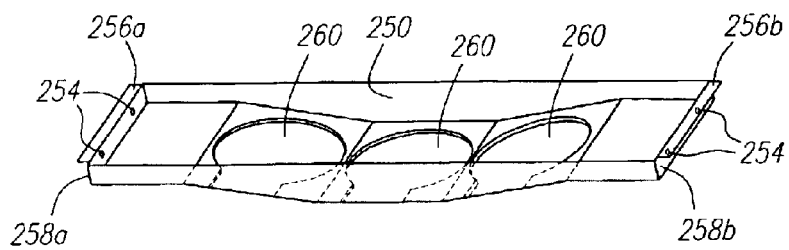
FIG. 4 is an illustration of a bracket configured for direct attachment to a lower compartment, having angled top surfaces, of an enclosure.

Turning to FIG. 4, optical unit bracket 250 of optical unit 210 is illustrated. Optical unit bracket 250 is adapted for use with enclosure 205 in that optical unit bracket 250 includes horizontal side extensions 256a, 256b and vertical side walls 258a, 258b that are configured to allow for the attachment of the optical unit bracket 250 to the side panels 230a, 230b without requiring additional mounting bracket hardware. The horizontal side extensions 256a, 256b and the vertical side walls 258a, 258b are located at the first and second end of the optical unit bracket 250. Each horizontal side extension 256a, 256b is preferably oriented at approximately a 90 degree angle to vertical side wall 258a, 258b respectively. When attached to side panels 230a, 230b, the horizontal side extensions 256a, 256b are placed on top of the angled top surfaces 235a, 235b. Placement of the horizontal side extensions 256a, 256b atop the angled top surfaces 235a, 235b allows the optical unit bracket 250 to be supported by the side panels 230a, 230b without requiring additional mounting brackets. The weight of the optical unit bracket 250 forces the horizontal side extensions 256a, 256b to press against the angled top surfaces 235a, 235b, thereby contributing to the secure attachment of the optical unit bracket 250 to the side panels 230a, 230b. The vertical side walls 258a, 258b, in turn, are securably attached to the side panels 230a, 230b using a suitable attachment element, such as a screw, a nail, or the like. As seen in FIG. 4, a plurality of attachment openings 254 are provided on each vertical side wall 258a, 258b to allow for an attachment element to be inserted therethrough to facilitate the attachment of optical unit bracket 250 to the side panels 230a, 230b. Additionally, a plurality of projection openings 260 are provided to which the projection units 220 are attached to the bracket 250. The projection openings 260 allow light to be projected from the projection units 220 through the optical unit bracket 250 and subsequently to mirror M.

Figure 5A:
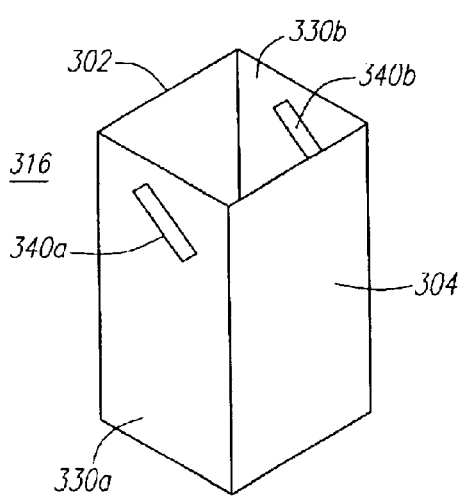
FIG. 5A is an illustration of an embodiment of the present invention showing a lower compartment of an enclosure wherein the lower compartment has an opening on each side panel for insertion and attachment of an optical unit thereto.

FIG. 5A illustrates another embodiment of the present invention. Shown in FIG. 5A is a lower compartment 316 of a projection television enclosure 305 (FIG. 6). The lower compartment 316 includes a front panel 302, a rear panel 304, and a plurality of side panels 330a, 330b. Two side panels 330a, 330b are illustrated, but the lower compartment 316 may include additional side panels in order to form, in conjunction with the upper compartment 314 (FIG. 6) an enclosure that is shaped other than as a rectangle or a square, such as, e.g., a trapezoidal enclosure, an irregularly shaped enclosure, or the like. The side panels 330a, 330b include openings 340a, 340b, respectively. An optical unit bracket 350 of an optical unit 310 (FIG. 6) is inserted within openings 340a and 340b.

Figure 1A:
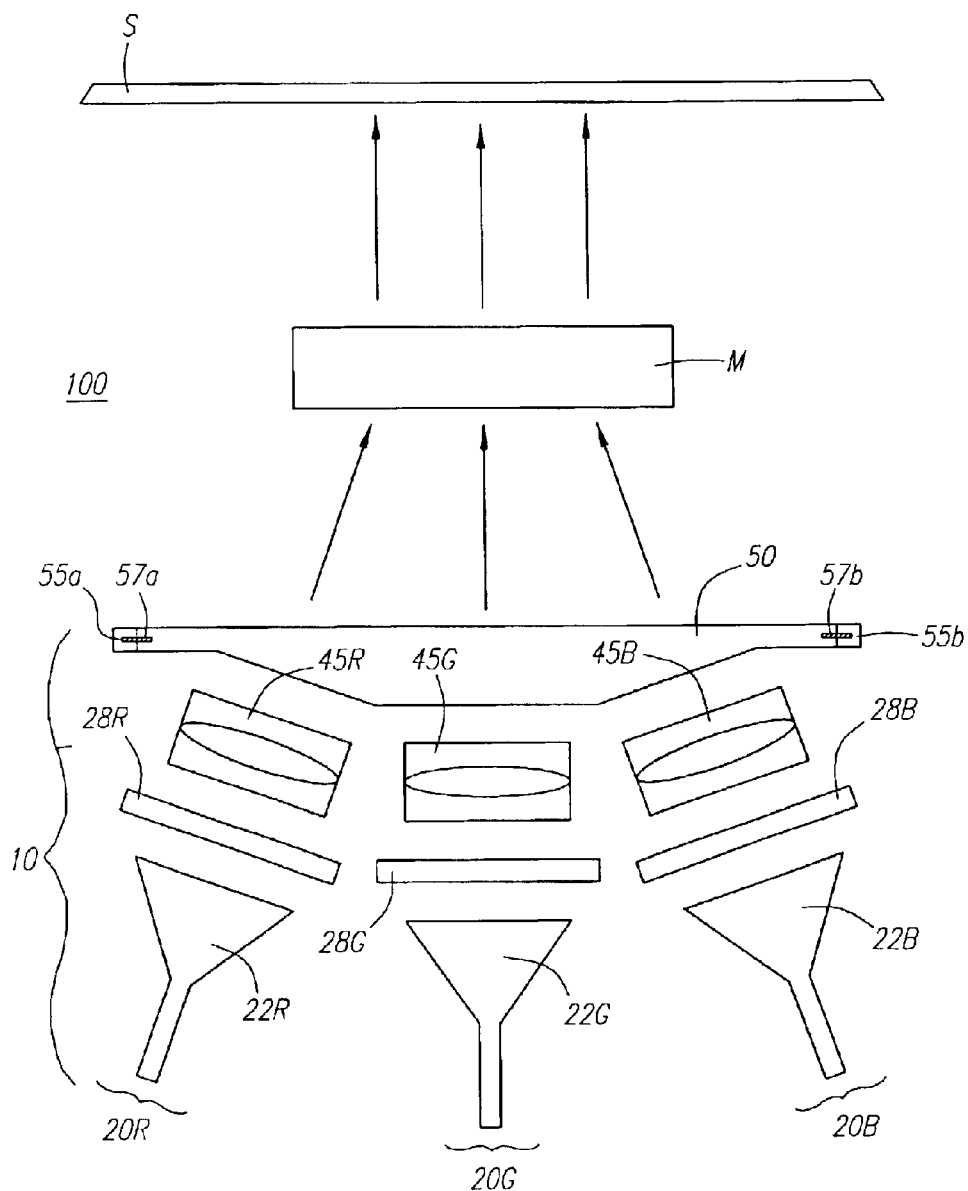
FIG. 1A illustrates a schematic representation of the components of a current, typical projection television set.
Figure 1B:
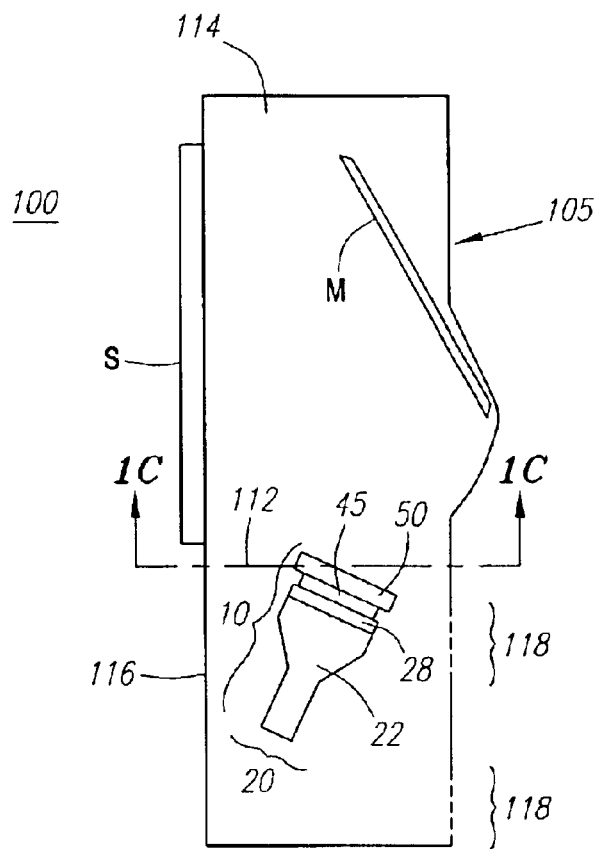
FIG. 1B is a side view of a current, typical projection television set showing an enclosure of the set with the components therein.
Figure 1C:
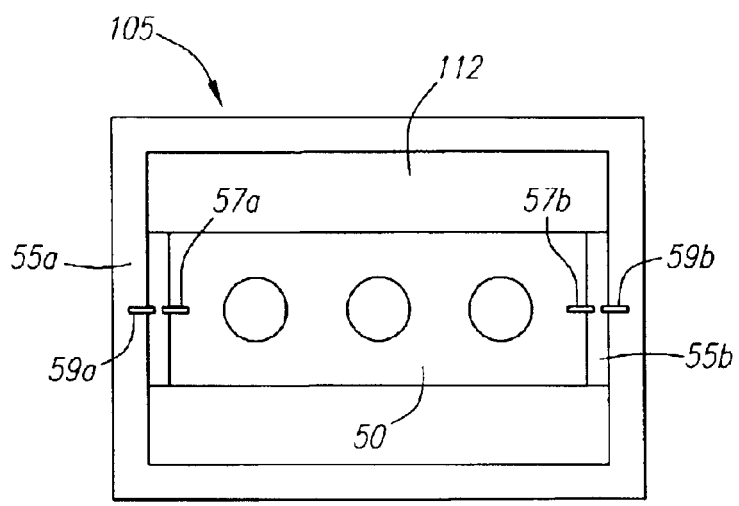
FIG. 1C is a top view of a cut-away of the projection television set illustrated in FIGS. 1A and 1B showing the attachment of an optical unit to the enclosure using mounting brackets.

Turning to FIG. 5A, the lower compartment 316 is illustrated with an optical unit bracket 350 of an optical unit 310 (FIG. 6) secured within openings 340a, 340b of side panels 330a, 330b. Preferably, openings 340a, 340b are angled such that when optical unit 310 is secured therein, optical unit 310 is oriented to optimally project light onto a mirror M (FIG. 6) located in the upper compartment 314 (FIG. 6). Further, openings 340a, 340b preferably conform to the size of optical unit bracket 350 such that when the optical unit bracket 350 is inserted through the openings 340a, 340b a secure fit is formed between the optical unit bracket 350 and the openings 340a, 340b. For example, the first end 355a and the second end 355b (FIG. 7) of optical unit bracket 350 and the openings 340a, 340b are preferably substantially the same size and shape. Additionally, an adhesive may be used ensure that the optical unit bracket 350 is fixed to the openings 340a, 340b of side panels 330a, 330b. For example, an adhesive may be applied around the circumference of the first end 355a and the second end 355b (FIG. 7) of the optical unit bracket 350 prior to insertion of the optical unit bracket 350 into the openings 340a, 340b. The optical unit bracket 350 is then inserted into openings 340a, 340b and is fixed thereto by the combination of the adhesive and the conformance of the openings 340a, 340b to the size of optical unit bracket 350, and more specifically to the first end 355a and the second end 355b of the optical unit bracket 350. Accordingly, the need for additional, separate mounting bracket hardware, such as, e.g., in the enclosure 105 illustrated in FIGS. 1B and 1C, is eliminated since the optical unit bracket 350 is secured directly to the side panels 330a, 330b of the lower compartment 316. Also, another advantage of lower compartment 316 is that the top surface of the lower compartment 316 is substantially level. As a consequence, lower compartment 316 is stackable, which provides benefits during the manufacture of enclosure 305. For example, the ability to stack lower compartment 316 allows a greater number of lower compartments to be stored within a warehouse or manufacturing facility pending attachment of those lower compartments to upper compartments to form enclosures.

Figure 5B:
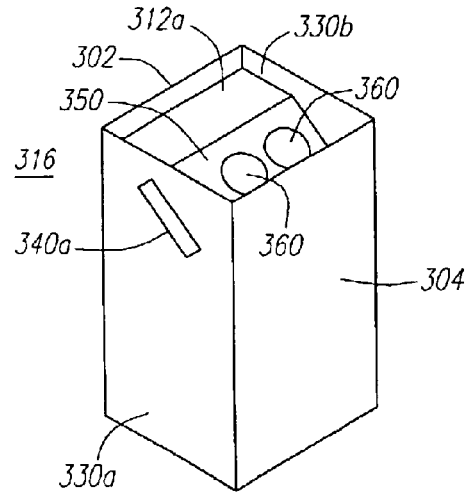
FIG. 5B is an illustration of the lower compartment of an enclosure shown in FIG. 5A having a bracket of an optical unit affixed to each opening on each side panel.

FIG. 5B illustrates lower compartment 316 with the optical unit bracket 350 secured to the side panels 330a, 330b. Additionally, a panel 312a is disposed between front panel 302 and optical unit bracket 350 and panel 312b (FIG. 6) is disposed between rear panel 304 and bracket 350. Together, panels 312a and 312b form inner walls separating the space within the lower compartment 316 from the space within the upper compartment 314 (FIG. 6) of the enclosure 305. FIG. 5C is a side view of lower compartment 316 showing panels 312a and 312b disposed therein. Additionally, a side panel 330 (which corresponds to side panels 330a and 330b) having an opening 340 (which corresponds to openings 340a and 340b) for insertion of optical unit bracket 350 is illustrated.

FIG. 6 illustrates a side view of an embodiment of enclosure 305 of a projection television set 300 that includes lower compartment 316 and upper compartment 314. Upper compartment 314 houses a mirror M and a screen S. Lower compartment 316 is illustrated with optical unit 310 attached thereto. Optical unit 310 includes a plurality of projection units 320 and an optical unit bracket 350. Each projection unit 320 includes a cathode ray tube (CRT) 322, a projection lens 345, and a spacer 328 mounted between each CRT 322 and projection lens 345. The optical unit 310 is attached to the optical unit bracket 350. As previously discussed, the optical unit bracket 350 is inserted into openings 340a and 340b of side panels 330a and 330b (both identified as opening 340 of side panel 330 in FIG. 6). The optical unit bracket 350 is maintained within openings 340a, 340b since the size of openings 340a, 340b preferably conform substantially to the size of first end 355a and the second end 355b (FIG. 7) of the optical unit bracket 350. Additionally, an adhesive may be applied around the circumference of the first end 355a and the second end 355b in order to further fix the optical unit bracket 350 to side panels 330a, 330b. Also illustrated in FIG. 6 are panels 312a and panel 312b that form inner walls between the space within the upper compartment 314 and the lower compartment 316.

FIG. 7 illustrates an optical unit bracket 350 that is suitable for use with lower compartment 316. Specifically, optical unit bracket 350 includes a first end 355a and a second end 355b. First end 355a and second end 355b are substantially the same size and shape as openings 340a and 340b on side panels 330a and 330b. When inserted into openings 340a, 340b, the first end 355a and the second end 355b form a tight fit within openings 340a, 340b, thereby securing optical unit bracket 350 within side panels 330a, 330b. Further, as previously discussed, an adhesive may be applied around the circumference of first end 355a and second end 355b to further ensure that the optical unit bracket 350 is fixedly secured within openings 340a, 340b of side panels 330a, 330b. Optical unit bracket 350 also includes a plurality of projection openings 360 where the projection units 320 are attached to the optical unit bracket 350. The projection openings 360 allow light to be projected from the projection units 320 through the optical unit bracket 350 and subsequently onto mirror M.

Figure 8A:
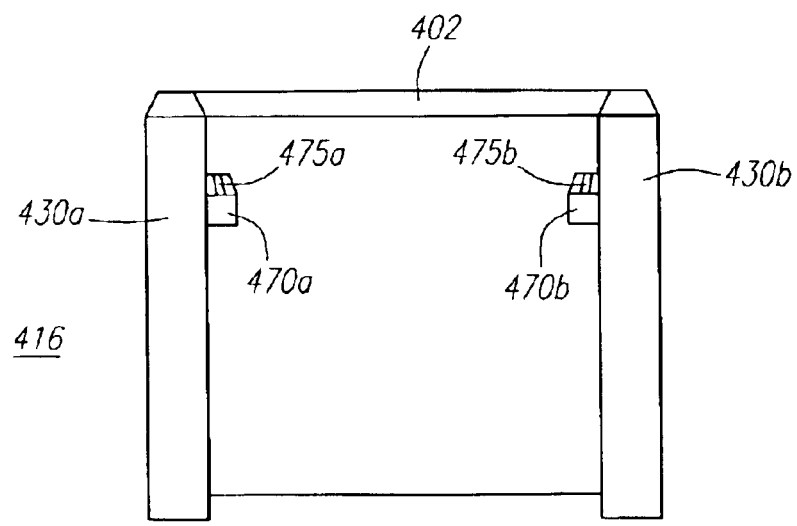
FIG. 8A is an end view of another lower compartment of an enclosure of the present invention having bracket mounting members located on each side panel of the lower compartment to fixedly engage a bracket of an optical unit.
Figure 11:
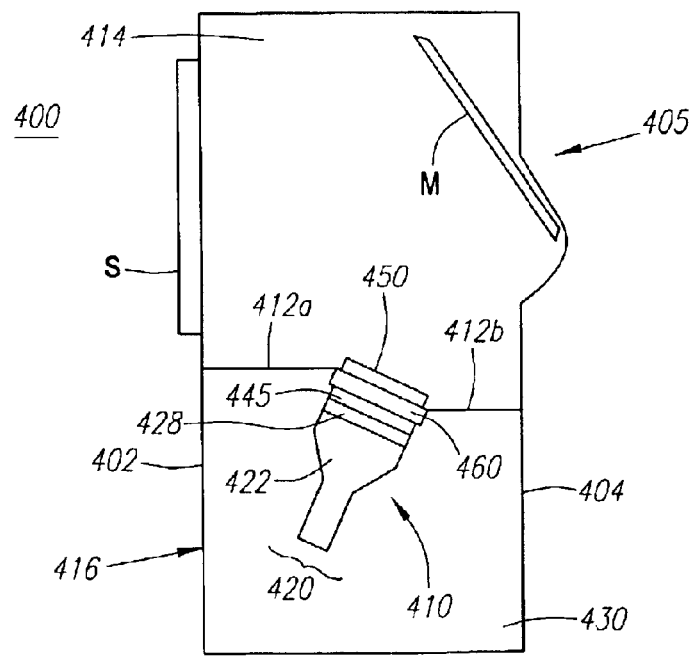
FIG. 11 is a side view of an enclosure of the present invention that incorporates the lower compartment shown in FIG. 8A.

Turning now to FIG. 8A, another embodiment of the present invention is shown. Lower compartment 416 includes a front panel 402, a rear panel (not shown), and a plurality of side panels 430a, 430b. The lower compartment 416 together with an upper compartment 414 (FIG. 11) forms an enclosure 405 (FIG. 11). As illustrated, lower compartment 416 includes two side panels 430a, 430b. It should be recognized, however, that lower compartment 416 may include a greater number of side panels if the desired shape of the enclosure is a shape other than a square or rectangle.

Figure 10:
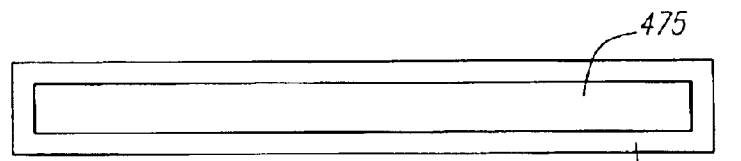
FIG. 10 is a top view of a bracket mounting member of the side panels of the lower compartment shown in FIG. 8A, illustrating a notch on the bracket mounting member configured to receive and engage the detents of the bracket illustrated in FIGS. 9A and 9B.

Located on each side panel 430a, 430b is a bracket mounting member 470a, 470b. The bracket mounting member 470a, 470b is oriented at a downward angle, i.e., the end of each bracket mounting member 470a, 470b facing the rear panel (not shown) is disposed at a lower position on the side panel 430a, 430b than the end of each bracket mounting member 470a, 470b that faces the front panel 402. As seen in FIG. 10, each bracket mounting member 470 (bracket mounting members 470a and 470b are collectively identified in FIG. 10 as 470; further references to a bracket mounting member 470 are intended to encompass both bracket mounting members 470a and 470b as such discussion will generally be applicable to both) includes a notch 475 that extends lengthwise along the bracket mounting member 470. The notch 475 accepts and engages detents 455a, 455b located distally and on the underside of an optical unit bracket 450 of an optical unit 410 (FIG. 1).

Figure 9A:
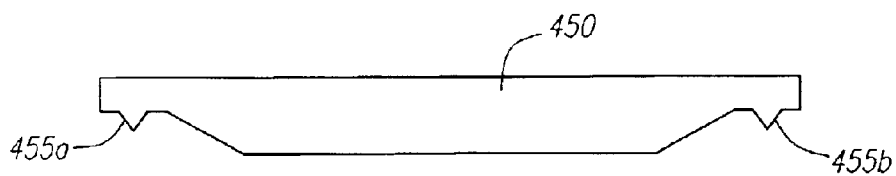
FIG. 9A is an end view of a bracket having detents configured for engaging the bracket mounting members of the side panels of the lower compartment shown in FIG. 8A.
Figure 9B:
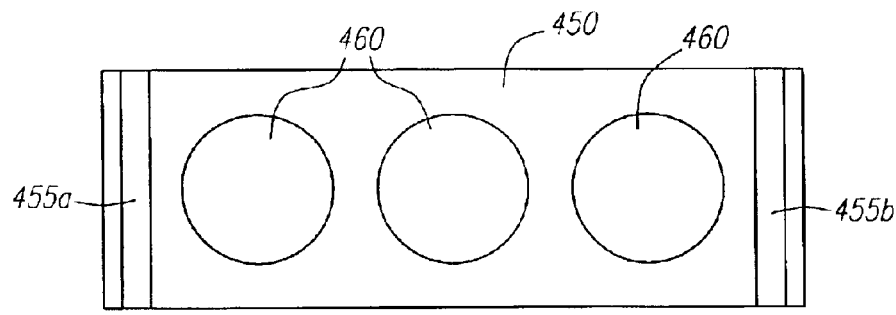
FIG. 9B is a view of the underside of a bracket having detents for engaging the bracket mounting members of the side panels of the lower compartment shown in FIG. 8A.

FIG. 9A shows an end view of an optical unit bracket 450 having detents 455a, 455b designed for placement into the notch 475 on bracket mounting members 470a, 470b respectively. FIG. 9B shows an underside view of the optical unit bracket 450. As seen in FIG. 9B, detents 455a, 455b extend along the width of the optical unit bracket 450. Projection openings 460 to which the projection assemblies 420 are attached are also illustrated. Turning back to FIG. 10, the notch 475 on each bracket mounting member 470 is approximately equal in length to the detents 455a, 455b that extend along the optical unit bracket 450. Consequently, when the optical unit bracket 450 is placed on the bracket mounting member 470, and specifically when detents 455a, 455b are placed within the notch 475 on bracket mounting members 470a, 470b, the optical unit bracket 450 is fixedly engaged by the bracket mounting members 470a, 470b without the need for attachment elements such as screws, nails, or the like. To further affix the optical unit bracket 450 to the bracket mounting members 470a, 470b, an adhesive may be placed within the notch 475 of each bracket mounting member 470a, 470b prior to the placement of the detents 455a, 455b of the optical unit bracket 450 within the notch 475 of each bracket mounting member 470a, 470b.

Figure 8B:
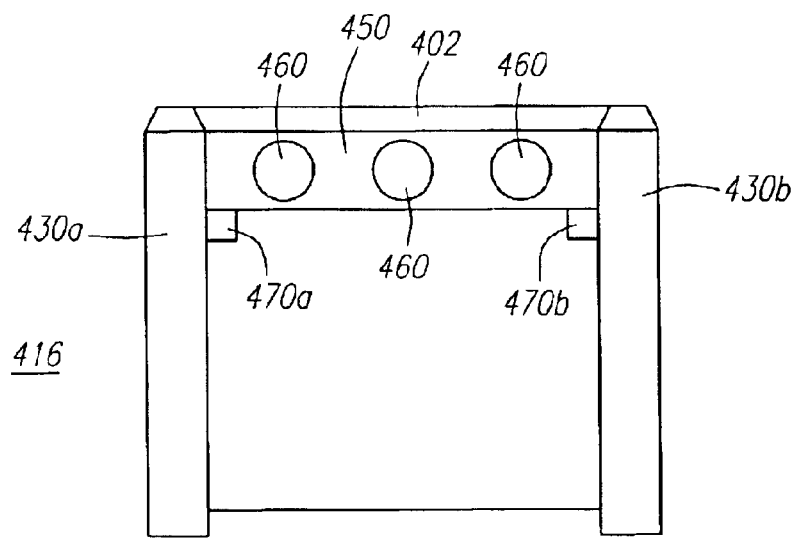
FIG. 8B is an end view of the lower compartment shown in FIG. 8A having a bracket fixedly engaged to the bracket mounting members of the side panels of the lower compartment.

Turning to FIG. 8B, FIG. 8B illustrates an optical unit bracket 450 fixedly engaged to bracket mounting members 470a, 470b and, therefore, attached to side panels 430a, 430b of lower compartment 416. As previously discussed, bracket mounting members 470a, 470b are attached to side panels 430a, 430b at a downward angle, i.e., the end of the bracket mounting members 470a, 470b facing the front panel 402 is higher relative to the end of the bracket mounting members 470a, 470b facing the rear panel (not shown). Consequently, when fixed or engaged to bracket mounting members 470a, 470b, optical unit bracket 450 is likewise oriented at a downward angle when viewed from the front panel 402 to the rear panel (not shown). Furthermore, the angle at which the bracket mounting members 470a, 470b, and the optical unit bracket 450, is oriented is substantially equivalent to an angle that optimizes the projection of light from the projection units 420 (FIG. 11) of the optical unit 410. For example, the optical unit bracket 450 is preferably aimed at the mirror M when it is engaged to the bracket mounting members 470a, 470b.

The bracket mounting members 470a, 470b may be constructed of injection molded plastic, vacuum formed plastic, particle board, other wood-based materials, or the like. In one embodiment, the bracket mounting members 470a, 470b are affixed to the side panels 430a, 430b after the side panels 430a, 430b are initially formed. For this embodiment, the bracket mounting members 470a, 470b may be secured to the side panels 430a, 430b using an adhesive, screws, nails, or the like. In another embodiment, the bracket mounting members 470a, 470b form a unitary part of the side panels 430a, 430b. For example, when the side panels 430a, 430b are formed of injected molded plastic or vacuum formed plastic, the side panels 430a, 430b may be formed having bracket mounting members 470a, 470b. With this embodiment, the step of separately attaching bracket mounting members 470a, 470b to side panels 430a, 430b after the initial formation of side panels 430a, 430b is eliminated.

FIG. 11 illustrates a side view of an enclosure 405 for a projection television set 400 that includes upper compartment 414 and lower compartment 416. As with the previously discussed embodiments of projection television set enclosures, the upper compartment 414 of enclosure 405 houses a mirror M and a screen S. Lower compartment 416 is shown with optical unit 410 attached thereto. Optical unit 410 includes a plurality of projection units 420 and bracket 450. Each projection unit 420 includes a cathode ray tube (CRT) 422, a projection lens 445, and a spacer 428 mounted between each CRT 422 and projection lens 445. The optical unit 410 is attached to optical unit bracket 450. As previously discussed, optical unit bracket 450 is fixedly engaged to bracket mounting members 460a, 460b of side panels 430a, 430b (both identified as bracket mounting member 460 of side panel 430 in FIG. 11). Once engaged to the bracket mounting members 460a, 460b, the optical unit bracket 450, and therefore the optical unit 410, is angled to optimally project light onto mirror M. Also illustrated in FIG. 1I are panels 412a and panel 412b that form inner walls between the spaces within upper compartment 414 and lower compartment 416. Panel 412a is located between optical unit bracket 450 and front panel 402 whereas panel 412b is disposed between optical unit bracket 450 and rear panel 404.

The particular examples set forth herein are instructional and should not be interpreted as limitations on the applications to which those of ordinary skill are able to apply this device. Modifications and other uses are available to those skilled in the art which are encompassed within the spirit of the invention as defined by the scope of the following claims.

What is claimed is:

1. A projection television set comprising:
    a screen;
    a mirror to reflect light onto the screen;
    an enclosure comprising
        an upper compartment to house the mirror and the screen; and
        a lower compartment attached to the upper compartment, the lower compartment comprising a front panel, a rear panel, a plurality of side panels, wherein at least two side panels further comprise an angled top surface, and a first and second top panel; and
    an optical unit comprising a plurality of projection assemblies and a bracket mounted on the top surface of the at least two side panels, wherein the first top panel is disposed between the front panel and the bracket and the second top panel is disposed between the rear panel and the bracket, and wherein the top panels and optical unit form an inner wall between the upper and lower compartments.

2. The projection television set of claim 1 further comprising a plurality of attachment elements to attach the bracket of the optical unit to the side panels of the lower compartment.

3. The projection television set of claim 1 wherein the angled top surface of the side panels of the lower compartment is cut at an angle to aim the optical unit at the mirror when the bracket is attached to the angled top surface.

4. The projection television set of claim 1 wherein the bracket comprises a first end and a second end, each end including a horizontal extension placed on top of the angled top surface of a side panel of the lower compartment, and a vertical wall placed adjacent the side panel.

5. The projection television set of claim 4 wherein the horizontal extension and the vertical wall of each end of the bracket are oriented at an approximately ninety degree angle to each other.

6. The projection television set of claim 4 wherein the vertical wall of each end of the bracket further includes a plurality of openings through which attachment elements are inserted.

7. The projection television set of claim 4 wherein each vertical wall further includes a plurality of openings for insertion of attachment elements and each vertical wall is oriented at an approximately ninety degree angle from each respective horizontal extension of each end of the bracket.

8. A projection television set comprising:
    a screen;
    a mirror to reflect light onto the screen:
    an enclosure comprising
        an upper compartment to house the mirror and the screen, and
        a lower compartment attached to the upper compartment, the lower compartment comprising a front panel, a rear panel, and a plurality of side panels wherein at least two side panels have angled openings and wherein the lower compartment further comprises a first and second top panel, the first top panel disposed between the front panel and the bracket and the second top panel disposed between the rear panel and the bracket and
    an optical unit comprising a plurality of projection assemblies and a bracket mounted within the angled openings of the at least two side panels, wherein the top panels and optical unit form an inner wall between the upper and lower compartments.

9. An enclosure for a projection television set comprising a mirror, a screen, and an optical unit, the optical unit comprising a plurality of projection assemblies and a bracket having a first end and a second end mounted to the enclosure, the enclosure comprising:
    an upper compartment comprising a front panel, a rear panel, and a plurality of side panels, the upper compartment configured to house the mirror and the screen, and
    a lower compartment attached to the upper compartment, the lower compartment comprising a front panel, a rear panel, and a plurality of side panels wherein at least two side panels further comprise an elongate body having a top surface, a bottom surface, a first end, a second end, and a notch extending between the first and second ends along the top surface, wherein the notch engages the bracket of the optical unit and wherein the elongate body is positioned on the side panels to aim the projection assemblies of the optical unit toward the mirror, wherein the lower compartment further comprises a first and second top panel, the first top panel disposed between the front panel and the bracket and the second top panel disposed between the rear panel and the bracket, wherein the top panels and optical unit form an inner wall between the upper and lower compartments.

10. The enclosure of claim 9 wherein the attachment region of the side panels comprises an angled surface for attachment of the bracket of the optical unit thereto, the angled surface oriented to aim the projection assemblies of the optical unit toward the mirror of the projection television set.

11. The enclosure of claim 9 wherein the attachment region of the side panels comprises an angled opening for insertion of the ends of the bracket of the optical unit therein, wherein the bracket is aimed toward the mirror when inserted into the angled opening.

12. The enclosure of claim 9 wherein the attachment region of the side panels comprises an elongate body having a top surface, a bottom surface, a first end, a second end, and a notch extending between the first and second ends along the top surface of the elongate body, wherein the notch engages the bracket of the optical unit.

13. The enclosure of claim 12 wherein the elongate body is positioned on the side panels to aim the projection assemblies of the optical unit toward the mirror.

14. The projection television set of claim 8 wherein the bracket comprises a first end and a second end, the ends and the angled openings of the side panels of the lower compartment being substantially equal in shape and size.

15. The projection television set of claim 14 further comprising an adhesive to secure the ends of the bracket to the side panels, wherein the ends are inserted within the angled openings of the side panels.

16. The projection television set of claim 8 wherein the angled openings are angled to aim the optical unit at the mirror when the bracket of the optical unit is inserted within the angled openings.

* * * * *